Patented Aug. 1, 1950

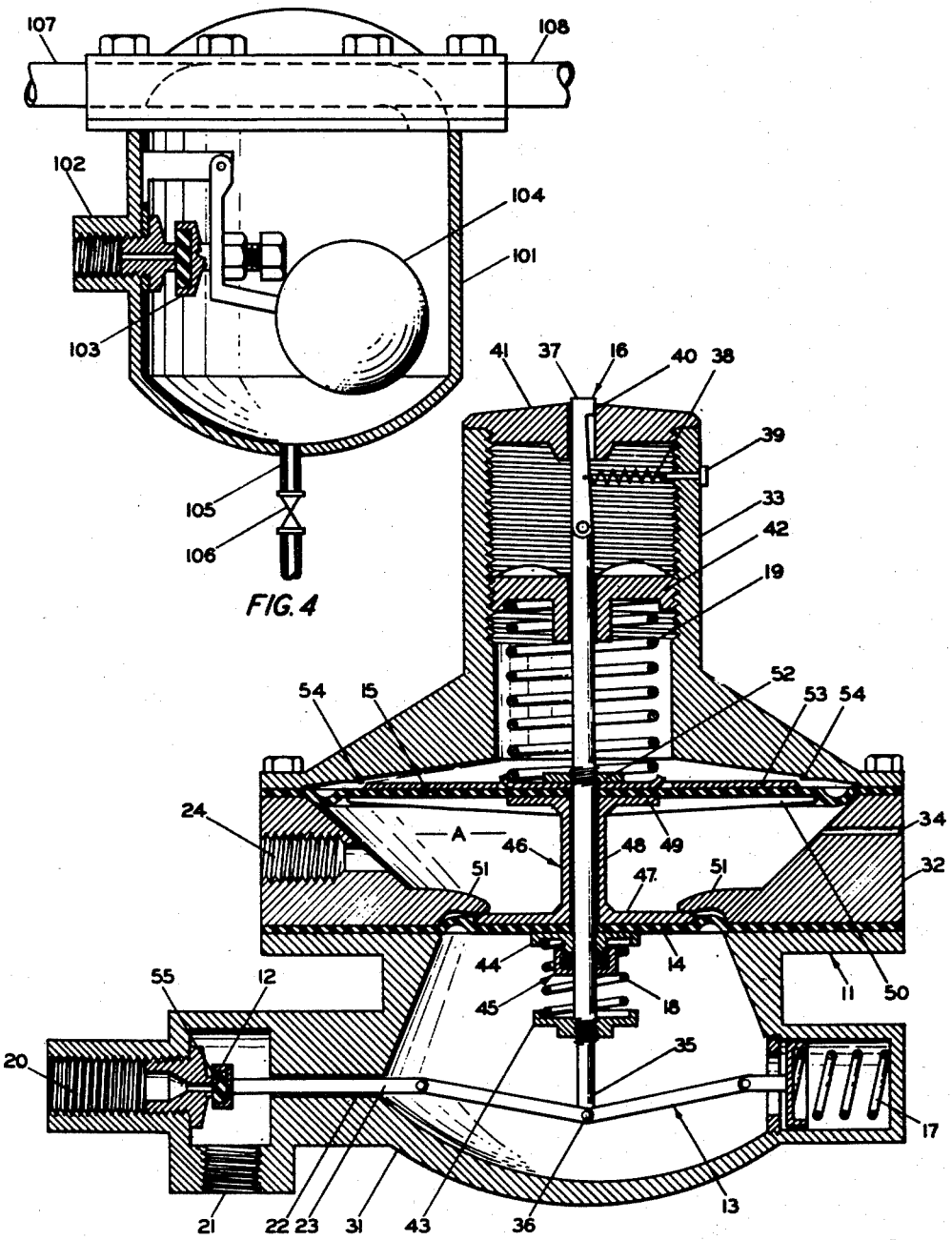

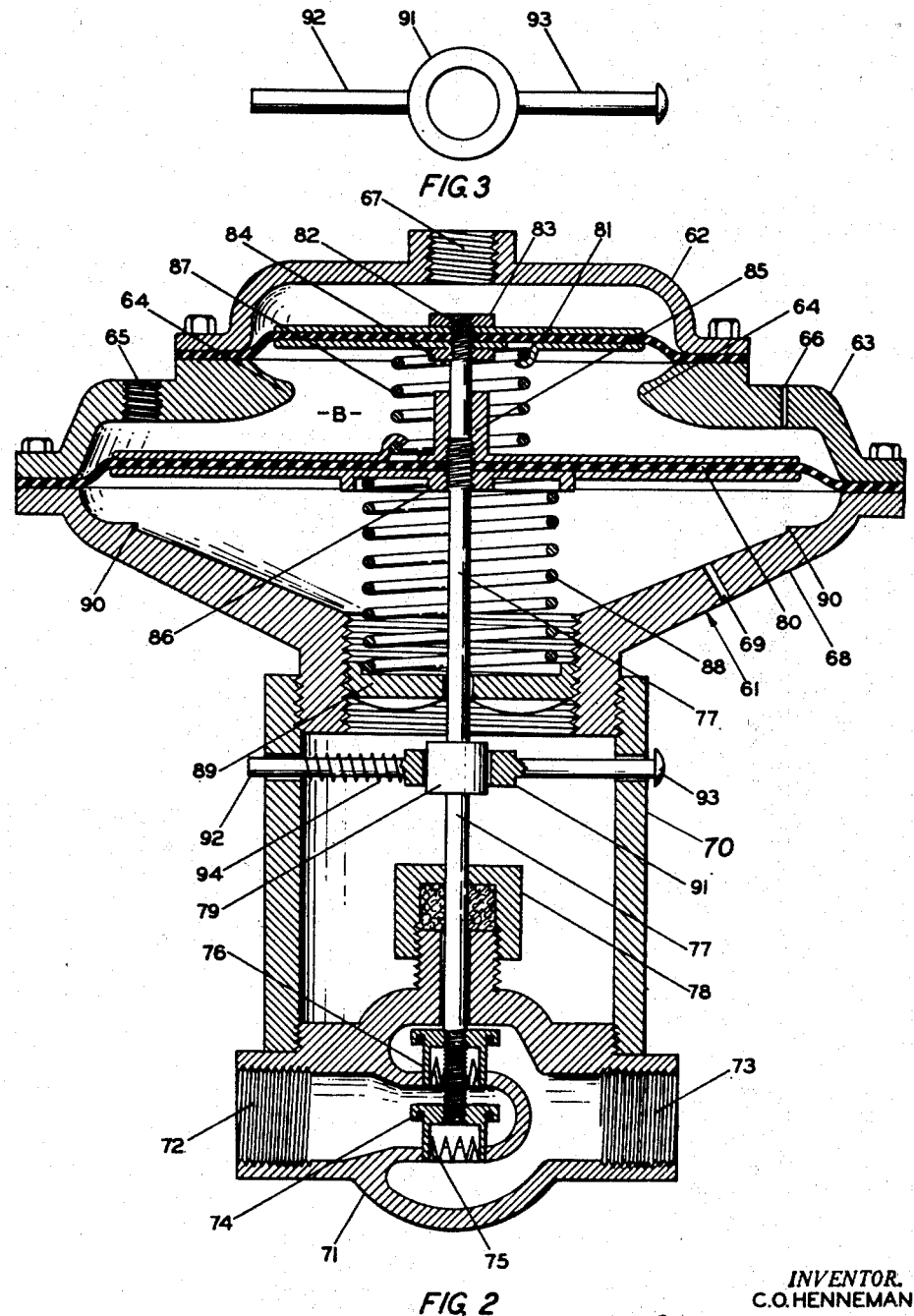

2,517,484

UNITED STATES PATENT OFFICE 2,517,484

SAFETY SHUTOFF AND REGULATING FLOW CONTROL VALVE AND VAPORIZATION SYSTEM

Clarence O. Henneman, Bartlesville, Okla., assignor to Phillips Petroleum Company, a corporation of Delaware Application August 20, 1946, Serial No. 691,722

3 Claims. (Cl. 62—1)

This invention relates to combination regulator and safety valves. In one of its more specific aspects it relates to the use of combination regulator and safety valves in conjunction with liquefied petroleum gas systems to prevent liquid from reaching a gas burning appliance.

Liquefied petroleum gas is used as fuel in many areas in which natural gas is not readily available. Since such areas are usually far removed from sources of production, transportation of this fuel becomes an important consideration. Such gases as propane or butane or mixtures of these are accordingly shipped and stored in pressure vessels and at or near the point of consumption the fuel is vaporized to permit use in gas burners. These liquids have appreciable latent heats of evaporation and in utility or industrial installations, the evaporation of the liquids in large volumes may present heat exchange problems. Vaporizers of one form or another are ordinarily used.

During heavy load periods or periods of erratic operation the capacity of heat exchange or vaporization equipment may at times be exceeded and unvaporized or liquid fuel may find its way into gas distribution mains or even to a gas burning appliance. Under such conditions gas burners do not function efficiently or safely.

One object of my invention is to provide a remedy for such an ill so that in L. P. G. systems liquid fuel cannot reach a gas burning appliance.

Another object of my invention is to provide a safety valve so that liquid fuel cannot enter a main designed to carry a gas.

Still another object of my invention is to provide a means for regulating the flow of a liquefied petroleum gas to a vaporizer so as to maintain a constant gas main pressure and at the same time to provide a safety liquid shut-off so that liquid fuel cannot enter the gas main or gas holder.

Yet another object of my invention is to provide a combination liquid flow regulator and safety shut-off device for use in L. P. G. systems.

Still another object of my invention is to provide for use in an L. P. G. system a combination liquid flow regulator and safety shut-off device which requires manual attendance when the safety shut-off feature has functioned before the system can be put back into operation.

Still other objects and advantages of my regulator-shut-off device will be apparent to those skilled in the art from a careful study of the following description and attached drawing which respectively describes and illustrates preferred embodiments of my invention.

Figure 1 is a diagrammatic cross section of one form of liquid flow regulator-safety shut-off valve.

Figure 2 is a diagrammatic cross section of another form of liquid flow regulator-safety shut-off valve.

Figure 3 is a plan view of the safety catch member of the regulator-shut-off valve of Figure 2.

Figure 4 is a cross sectional view, in part, of a float operated pilot valve for use in the assembly of Figure 5.

Figure 5:
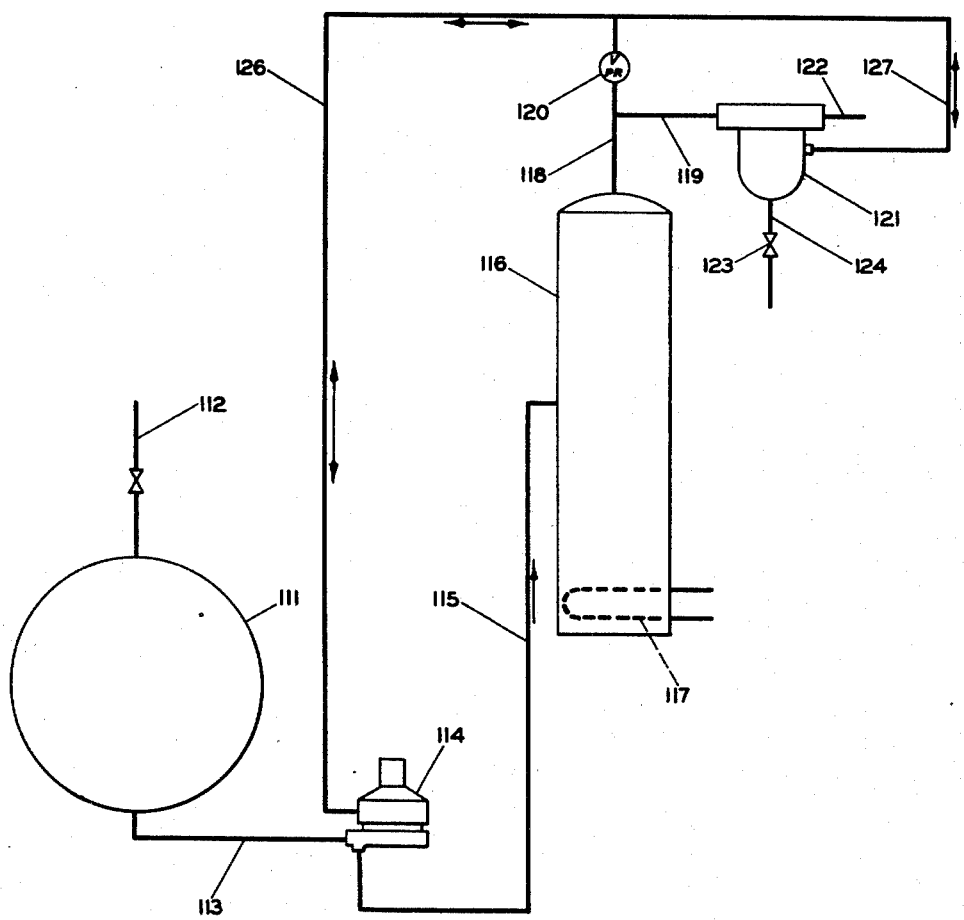

Figure 5 is a diagrammatic elevation of an L. P. G. vaporization system utilizing my regulator-safety cut-off type valves.

Referring now to the regulator-cut-off valve as illustrated in Figure 1, this valve is composed of a housing or body assembly 11, a valve 12, a valve lever assembly 13, two diaphragms 14 and 15, an emergency catch member 16, springs 17, 18 and 19, a liquid inlet 20 and outlet 21, an annular channel 22 around a valve stem 23, and a fluid inlet 24.

The housing assembly 11 may be composed of three parts, as shown, a valve housing 31, an intermediate diaphragm housing 32 and an upper diaphragm and spring housing 33. The intermediate housing 32 contains the threaded opening 24 and a vent 34.

An auxiliary valve stem or shaft 35 is attached at one end to the toggle assembly 13 at a pivot point 36 and at its other end to a hook member 37, as shown. This hook member is held firmly against the sidewall 40 of the opening in a closure plug 41 by the action of a spring 38 which is held in tension by a bolt member 39. The compression spring 19 is held in place by a compression nut 42.

A compression spring nut 43 may be threaded to the shaft 35, or otherwise attached thereto, and is adapted to hold the spring 18 in a proper compression against a spring seat 44 and thence against the small diaphragm 14. A packing gland assembly 45 may be attached directly to the diaphragm 14 or directly to the spring seat 44 which in turn is attached to this diaphragm in a gas tight manner. The shaft 35 is intended to be slidable within the packing gland assembly 45 without permitting loss of pressure from below the diaphragm.

A spool 46 may consist of a lower flange 47, a hollow shaft 48, an upper flange 49 and arms 50. The upper flange 49 is merely a circular flange having fingers or arms 50 protruding therefrom in such a manner as to provide a plane surface for contact against the underside of the diaphragm 15.

Some stops 51 limit the upward movement of the diaphragm 14.

The upper diaphragm 15 may be fixed to the shaft 35 by such means as a nut 52 which is attached to the shaft and to the diaphragm through a diaphragm plate 53. This diaphragm 15 may move upward and compress the spring 19, and when this movement occurs the diaphragm becomes separated from the flange 49 and fingers 50, since the movement of this spool member 46 is limited by the stops 51. The upward movement of the diaphragm 15 is limited when the diaphragm plate 53 touches underside of the housing 33 at points 54. When the shaft 35 is at substantially its limit of travel, the hook member 37 is pulled by the spring 38 to latch over the shoulder 40 of the opening in the plug member 41.

Spring 17 is intended to absorb some of the elongation movement of the toggle assembly 13 when shaft 35 is sufficiently high as to permit the hook 37 to be latched over the shoulder 40. This absorption of some toggle movement by the spring 17 protects a resilient gasket or sealing element 55 of the valve 12.

In Figure 2 an alternative regulating and shut-off valve is illustrated. This valve is composed of the same general parts as the valve of Figure 1, however, the structure is quite dissimilar. A main valve body or housing 61 is composed of several component parts, a diaphragm cover 62, a diaphragm separator 63 with stops 64, a threaded opening 65 and a vent 66. The diaphragm cover member 62 also has a threaded opening 67. A cover member 68 for a large diaphragm, has a vent 69, and a lower portion threaded for attaching to an upright body section 70. This latter section has a valve section 71 attached thereto which contains a fluid inlet opening 72 and outlet opening 73 and a double port valve assembly 74.

Two valves, 75 and 76, on a common valve stem 77 constitute this assembly. The stem 77 passes through a packing gland 78, and has an enlarged section 79, and the upper end extends a short distance through a large diaphragm 80. A short rod 82 is attached to a small diaphragm 81 by nuts 83 and 84 and extends downward into a collar member 85 and terminates adjacent the upper end of the valve stem 77. This rod 82 is adapted to axial movement in the collar 85 as the diaphragm 81 moves upward or as the diaphragm 80 and collar 85 move downward.

The upper threaded end of the valve stem 77 is held rigidly to the diaphragm 80 by the collar member 85 and lower nut 86.

A tension spring 87 separates these diaphragms.

Both diaphragms may be protected by cover plates. A compression spring 88 acting on the lower diaphragm 80 and spring stop nut 89 holds the valve stem 77 up and the valves 75 and 76 open except when pressure acts on top of either diaphragm to compress the spring and to close partly or fully the valves.

An enlarged section 79 on valve stem 77 may preferably be of circular cross section and may be made integral with the valve stem, or may be held in place with a set screw or by other means as desired.

Around this enlarged section 79 is a circular member 91 to which are attached rod like members 92 and 93, by for example, thread means, not shown. This assembly is illustrated in plan in Figure 3. A spring 94 is inserted over member 92, as shown, or it may be over the opposite end 93.

Shoulders 96 limit the extent of downward travel of the large diaphragm 80.

Figure 4 represents a float controlled pilot valve which I use in connection with an assembly of apparatus to be discussed hereinafter in conjunction with Figure 5.

This pilot float valve has a reservoir 101 with a side outlet 102 and a valve 103 controlled by a float 104. A bottom drain pipe 105 and a valve 106 are provided as shown. A vapor inlet pipe 107 and a vapor outlet pipe 108 are provided.

In Figure 5 is shown, diagrammatically an assemblage of the apparatus parts disclosed hereinbefore. In this figure an L. P. G. pressure storage tank 111 has an inlet connection 112 and an outlet connection 113. A pressure operated liquid flow regulator 114 is inserted in the outlet line 113. This regulator 114 is preferably a combination liquid flow regulator and safety cut-off valve such as illustrated in Figure 1 of the attached drawing. As an alternative regulator-cut-off valve, the one illustrated in Figure 2 may be used.

The tank outlet line 113 is the liquid inlet line to the regulator valve 114, while a line 115 is the liquid outlet line from the regulator and connects with a vaporizer vessel 116. A heat exchanger coil 117 may be provided, as shown, in the vaporizer. A vapor outlet line 118 is adapted to conduct vaporized L. P. G. from the vaporizer vessel 116 to the float controlled pilot valve 121, such as illustrated in Figure 4. Line 122 conducts vapor or gas to a gas holder or to a gas main, not shown. Drain line 124 and valve 123 are for removal of trapped liquid from the pilot valve 121.

A pressure relief valve 125 is inserted in line 118 and set in such a manner that when a maximum pressure is exceeded in the vaporizer 116 this valve opens to permit pressure to be transmitted through a pipe 126 to a control valve 114.

A line 127 connects the side outlet of the pilot valve 121 to the control line 126.

*Operation*

The liquid regulator-safety cut-off valve of Figure 1, as hereinbefore mentioned, has two diaphragms, a large one and a small one, identified respectively by reference numerals 15 and 14.

Liquid enters this valve through the liquid inlet 20 and leaves through outlet 21 after having passed through the valve 12. During passage of liquid through the valve, some liquid passes through the annular passage 22 surrounding the valve stem 23. When this liquid is such as propane or butane, its vapor pressure acts on the underside to raise the small diaphragm 14 and accordingly to throttle or to close off the flow of liquid through the valve. When the pressure on the down stream side of the valve decreases below a certain value, the spring 19 operates to lower the shaft 35 which opens the valve 12. This portion of the valve may be termed "regulating" and liquid flow regulator valves are known in the art. The stops 51 or other means are intended to limit the upward movement of the diaphragm 14.

The space A between the two diaphragms is normally at atmospheric pressure since this space is vented to the atmosphere through the vent 34.

However, when pressure is admitted to this space through the opening 24, the action against the upper diaphragm predominates since the upper diaphragm is the larger of the two. Accordingly the diaphragm 15, plate 53, nut 52 and shaft 35 raise until the latch 37 hooks over the edge 40 of the closure nut 41 by the action of the tension spring 38. Excess lengthening of the toggle assembly over that necessary to close the valve 12 is absorbed by the spring 17. When the large diaphragm 15 moves upward to latch the valve in a closed position, the diaphragm 15 is free to separate from the upper spool flange 49 and arms 50.

This valve remains shut as long as the latch 37 remains in its hooked position. No mechanical nor automatic provision is made for releasing the latch 37 since it is desired to do it manually.

Upon manually releasing the latch 37, the shaft 35 drops to an extent dictated by the pressure in the space A, if this pressure has dropped to atmospheric through closing off of a source of pressure and venting through the vent 34, then the shaft 35 drops sufficiently to permit valve 12 to open and permit flow of fluid therethrough.

Thus in the valve embodiment illustrated in Figure 1, the diaphragm 14 controls the metering action of the valve 12 while the diaphragm 15 controls the safety closing off of the flow of liquid until the safety catch is opened manually.

In the valve embodiment illustrated in Figure 2, liquid enters through inlet 72, passing through the valves 75 and 76 and leaves through the liquid outlet 73.

This valve operates in substantially the same manner as does the valve of Figure 1. A tube, not shown in Figure 2, may connect the opening 67 with any source of pressure with which it is desired to control the metering action of the valve, for example, the line pressure downstream from outlet 73. Thus, as pressure pushes downward on the top of diaphragm 81, the stem 82 pushes against stem 77 and the valves 75 and 76 throttle or close. Upon release of this pressure the action of spring 88 raises diaphragms and stems 82 and 77 and accordingly the valves open. When pressure depresses the diaphragm 81, the diaphragm 80 and attached parts also move in the same direction as does diaphragm 81. This action in closing or partly closing and opening of the valves 75 and 76 is the "regulating" action of the valve, and as mentioned hereinbefore, flow regulators are old in the art.

However, when pressure is admitted by way of opening 65 into a space B between the two diaphragms 80 and 81, since the area of diaphragm 80 is the greater, this diaphragm pushes downward on shaft 77 until the valves 75 and 76 close and the upper surface of the enlarged section 79 is below the lower surface of the safety catch member 91. The spring 94 then operates to push one side of the circular member 91 over the top of member 79 in such a manner that the valves 75 and 76 remain closed.

Mechanical or automatic release of this safety lock is not provided since it is desired to affect the release manually.

The float controlled pilot valve of Figure 4 operates in such a manner that as liquid accumulates in the vessel, the float 104 rises to open the valve 103 and thereby permit the accumulated liquid or high pressure vapors to leave the vessel through the opening 102. Inlet pipe 107 discharges contents passing therethrough into the vessel, while vapors are removed through the outlet line 108. Liquid contents which will not flow out the side outlet 102 may be removed through pipe 105 and valve 106.

Operation of the system

Figure 5 illustrates, diagrammatically the component parts of my regulator system and their assemblage.

L. P. G. such as propane or butane, or mixtures of these, are stored in tank 111. This liquid may be withdrawn from the storage tank through pipe 113, passed through the regulator-shut-off valve 114, and through pipe 115 into the vaporizer 116. A heating medium, as steam or water, from a source, not shown, passes through exchange coil 117 to supply latent heat for the vaporization of the L. P. G.

During overload periods, or through failure of the heat exchanger, etc., unvaporized liquid may leave the vaporizer through line 118 and pass out line 119 to the float controlled pilot valve 121. Liquid entering this vessel settles to the bottom while vapor or gas passes on out the gas line 122 to a holder or main. The accumulation of liquid in the pilot valve lifts the float and permits a small amount of gas or liquid to enter line 127. The gas or liquid under its vapor pressure also passes from line 127 through line 126 into the valve 114, which for exemplary purposes, may be the valve of Figure 1. When such is the case the gas or liquid under its vapor pressure enters through opening 24 into the space A between the diaphragms. Pressure in the space raises the upper diaphragm 15 and stem 35 until the latch 37 catches to hold closed the valve 12. This valve then remains locked until an operator releases the latch 37. It is intended that prior to releasing the latch 37 that the operator will inspect the system for discovery of reasons why liquid passed into the pilot valve from the vaporizer.

When the source of trouble is remedied and the vaporizer so adjusted as to proper operation, the safety latch on the control valve 114 may be released and the valve permitted to operate.

During the operation of such a valve as illustrated in Figure 1, the metering or flow control portion operates in response to the opposing action of the spring 19 and the small diaphragm 14. The pressure in the toggle chamber below the diaphragm will be substantially proportional to the pressure in the vaporization chamber since the annular space 22 permits fluid communication between the downstream side of the valve 12 and this toggle space.

This system has a further safety feature in that a pressure relief valve 129 is inserted in the outlet line 118 from the vaporizer so that if a certain predetermined maximum pressure is exceeded in the vaporizer 116, such as might result from failure of valve 12 to close completely, or from closing of a master valve downstream from float controlled pilot valve 121, pressure will enter line 126 through the relief valve and cause the locking of the valve 114 in its fully closed position. This valve will then remain closed until unlatched manually, and as planned after the operator has discovered and remedied the source of trouble.

The system of Figure 5 may be operated with the regulator-safety cut-off valve of Figure 2 substituted for the valve of Figure 1, which combination with the valve of Figure 1 was explained above.

By substituting the valve of Figure 2, the operation of the system is substantially the same. A pipe, not shown, connects the vaporizer outlet line 118 with the opening 67 (Figure 2), or this opening 67 may be connected directly with the liquid outlet 73 of the valve so that the liquid pressure on the downstream side of the valves 75, 76 or the pressure of the vaporizer tank will be communicated to the upper side of the upper diaphragm 81. Pressure on this diaphragm operates to throttle or to close the valves 75, 76 by a downward movement thereof against the compressive spring 88. The adjusting nut 89 is so set that a properly selected spring 88 will operate to control the flow of any desired liquefied petroleum gas passing through the valves and line 115 into the vaporizer tank 116 to maintain a predetermined vaporizer tank pressure. Thus, some increase in pressure in the vaporizer 116 will act to throttle the flow of liquid into the vaporizer or to stop the flow completely. However, upon reduction of pressure in vaporizer 116 the responsive diaphragm rises to open the valves. Thus, this action is a regulating action.

In case of failure of some component apparatus part to function in that liquid leaves the evaporator in the vapor line 119, the liquid separates in the pilot valve 121 and ultimately causes the float 104 of Figure 4 to rise and open the valve 103. When valve 103 is open, pressure is communicated through lines 127 and 126 and through the opening 65 of the valve of Figure 2 into the space between the diaphragms 80 and 81. This diaphragm 80 and connected parts move downward to such a degree that ring 91 moves over member 79 by action of the spring 94 to lock closed the valves and stop completely the flow of liquid therethrough.

To place the valve mechanism into operation, the pin 93 must be manually pushed to free the valve shaft 77 (and enlarged part 79) from the safety latch when the shaft 77 rises to open the valves 75 and 76.

As soon as the source of excessive pressure is removed the pressure within the space B soon reaches atmospheric by venting through opening 66, then the safety catch may be released and the valve put back into operation.

As when using the valve of Figure 1, the pressure relief valve 120 may be used to lock the valve closed in case excessively high pressures occur in the vaporizer vessel, because of failure of valves 75 and 76 to reduce sufficiently the flow of liquid to the vaporizer, or for any other reason.

Liquid may be drained from the pilot valve vessel by opening valve 106 in drain pipe 105.

The valves of Figures 1 and 2 are substantially equivalents since they both have pressure responsive flow control features and pressure responsive safety shut-off features, and both safety shut-off features must be manually released to put the valves back into operation.

And further, the shut-off features of the valves are intended to be responsive to excess vaporizer pressures and to pressures of liquid trapped in the pilot valve (121).

By the use of such a pilot valve apparatus as herein disclosed in conjunction with my safety shut-off-regulator valves, I am able to operate large capacity liquefied petroleum gas vaporization systems without allowing unvaporized liquid to reach a gas storage holder or to enter gas distribution lines.

It will be obvious to those skilled in the art that many variations and modifications of my dual action valves may be made and yet remain within the intended spirit and scope of my invention.

Materials of construction of the valves and of the remainder of the apparatus illustrated in Figure 5 may be selected from among those commercially available and familiar to those versed in such art.

Having disclosed my invention, I claim:

1. A liquefied petroleum gas vaporization system adapted to eliminate the flow of unvaporized liquid downstream of the system resulting from erratic vaporization comprising, in combination, a source of liquefied petroleum gas, a combination regulator and safety shut-off valve, a vaporizer means, and a gas-liquid separating means connected in series in the order given; said combination regulator and safety shut-off valve adapted to regulate the flow of liquefied petroleum gas passing therethrough in response to pressure downstream of said valve, said valve being adapted to close in response to an accumulation of liquefied petroleum gas in said gas-liquid separating means, and a locking means adapted to hold said valve in a closed condition when closed in response to said liquefied petroleum gas in said gas-liquid separating means, said locking means being adapted for manual release.

2. A liquefied petroleum gas vaporization system adapted to eliminate the flow of unvaporized liquid downstream of the system resulting from erratic vaporization comprising, in combination, a source of liquefied petroleum gas, a combination regulator and safety shut-off valve, a vaporizer means, and a gas-liquid separating means connected in series in the order given; said combination regulator and safety shut-off valve being adapted to regulate the flow of liquefied petroleum gas passing therethrough in response to pressure downstream of said valve, said valve being adapted to close in response to an accumulation of liquefied petroleum gas in said gas-liquid separating means, a locking means adapted to hold said valve in a closed condition when closed in response to said liquefied petroleum gas in said gas-liquid separating means, and means for withdrawing said accumulated liquefied petroleum gas from said gas-liquid separating means, said locking means being adapted for manual release.

3. A liquefied petroleum gas vaporization system adapted to eliminate the flow of unvaporized liquid downstream of the system comprising, in combination, a source of liquefied petroleum gas; a combination regulator and safety shut-off valve comprising a valve housing having a liquid inlet and a liquid outlet and a valve therebetween, a pressure responsive diaphragm means for actuating said valve to regulate the flow of liquid therethrough, said pressure responsive diaphragm means being responsive to pressure downstream of said regulating valve, a further pressure responsive diaphragm means for further actuating said valve to stop completely the flow of liquid therethrough and a locking means adapted to maintain said valve in a closed condition when closed by action of said further pressure responsive diaphragm means, said locking means being adapted for manual unlocking; a vaporizer means; and a gas-liquid separating means having a space normally filled with gas, an outlet therefor, a space receptive of liquid, means communicating said liquid receptive space with said further pressure responsive device to close said valve to the flow of liquefied petroleum gas therethrough when said liquid receptive space contains a predetermined quantity of liquid, and means for removing liquid from said liquid receptive space; said source, said combination regulator and safety shut-off valve; said vaporizer means, and said gas-liquid separating means being connected in series in the order given; said locking means being adapted for maintaining said valve in a closed and locked condition as long as at least said predetermined quantity of liquid remains in said liquid receptive space in said gas-liquid separating means, and being adapted for manual unlocking of said closed valve only when said liquid receptive space in said gas-liquid separating means contains less than said predetermined quantity of liquid.

CLARENCE O. HENNEMAN.

REFERENCES CITED

The following references are of record in the file of this patent:

UNITED STATES PATENTS

| Number | Name | Date |
|---|---|---|
| 2,012,361 | Thomas et al. | Aug. 27, 1935 |
| 2,033,842 | McFarland | Mar. 10, 1936 |
| 2,289,639 | Fausek et al. | July 14, 1942 |
| 2,319,819 | Martin | May 25, 1943 |
| 2,335,837 | Abramson | Nov. 30, 1943 |